April 19, 1955      R. E. GRILL      2,706,431
ROCKET JETTISON MECHANISM
Filed May 16, 1949      4 Sheets-Sheet 1
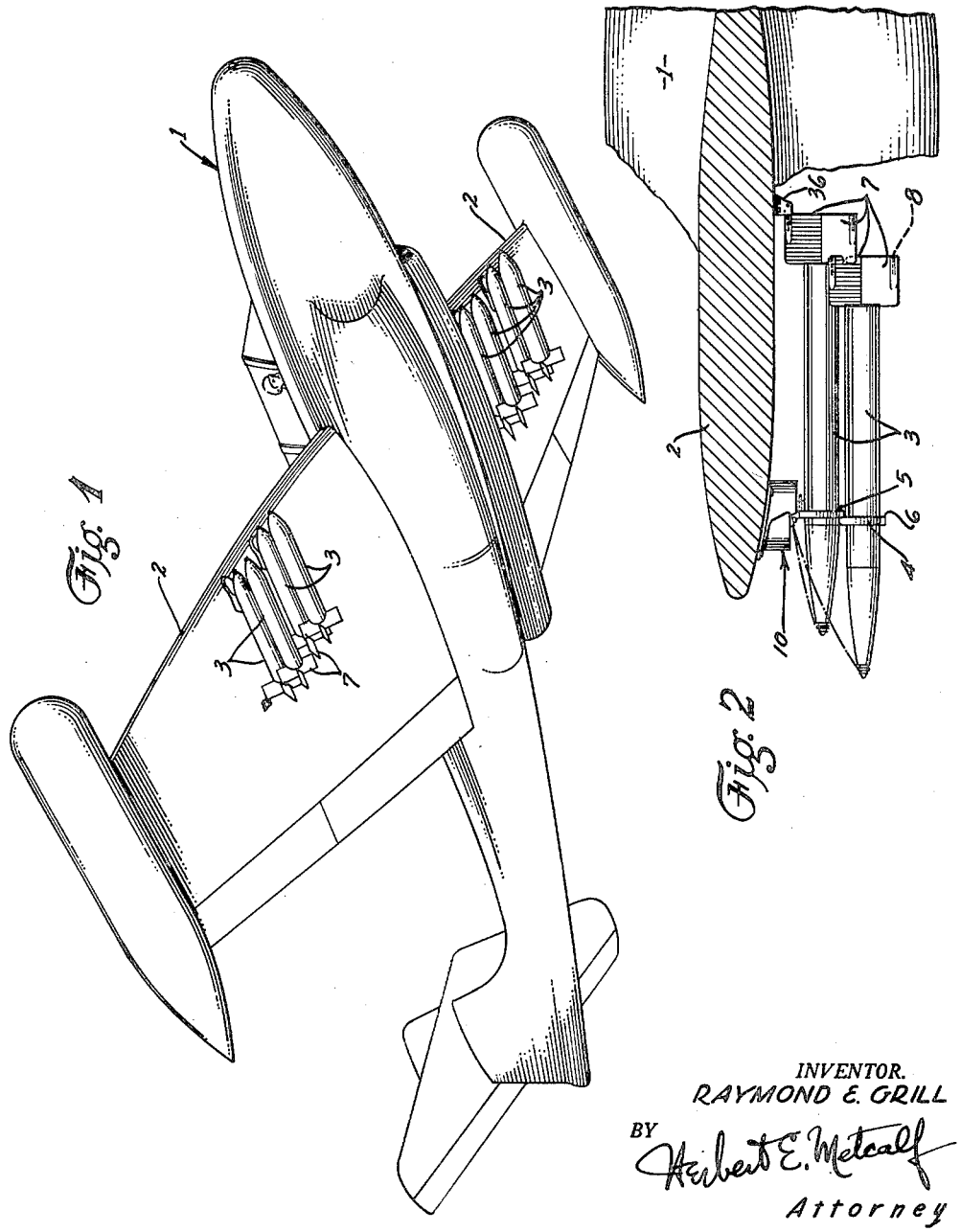
INVENTOR.
RAYMOND E. GRILL
BY *Herbert E. Metcalf*
Attorney April 19, 1955        R. E. GRILL        2,706,431
ROCKET JETTISON MECHANISM
Filed May 16, 1949        4 Sheets-Sheet 2
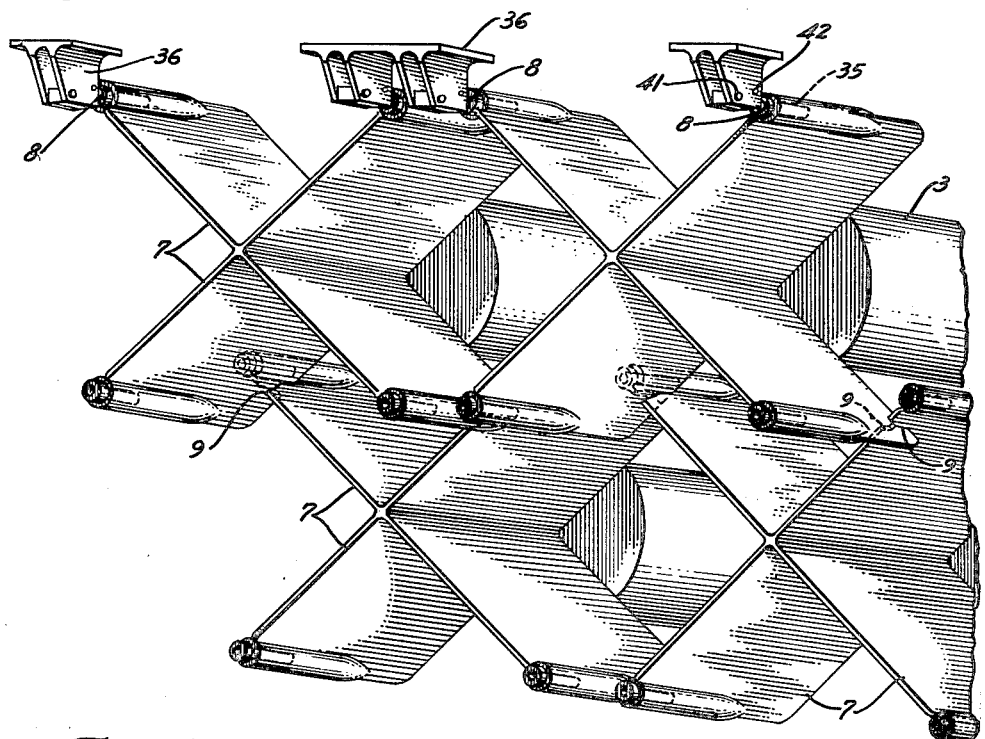
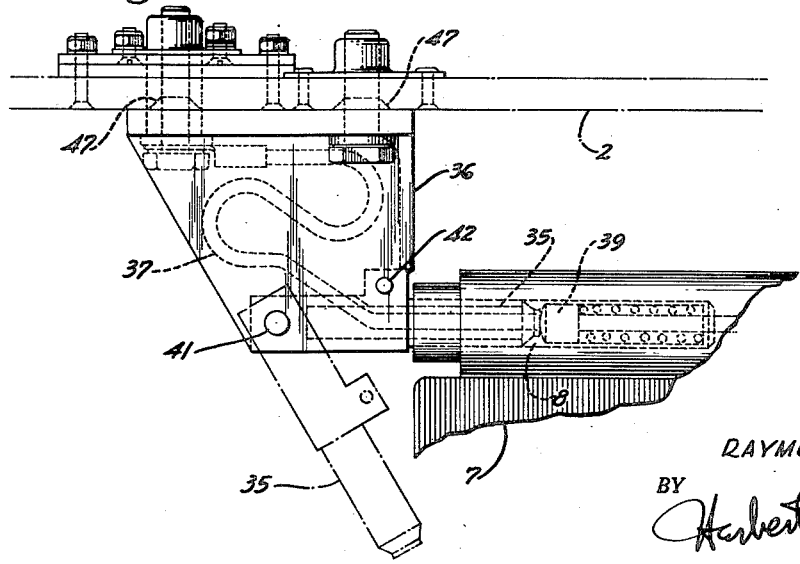
INVENTOR.
RAYMOND E. GRILL
BY
*Herbert E. Metcalf*
Attorney

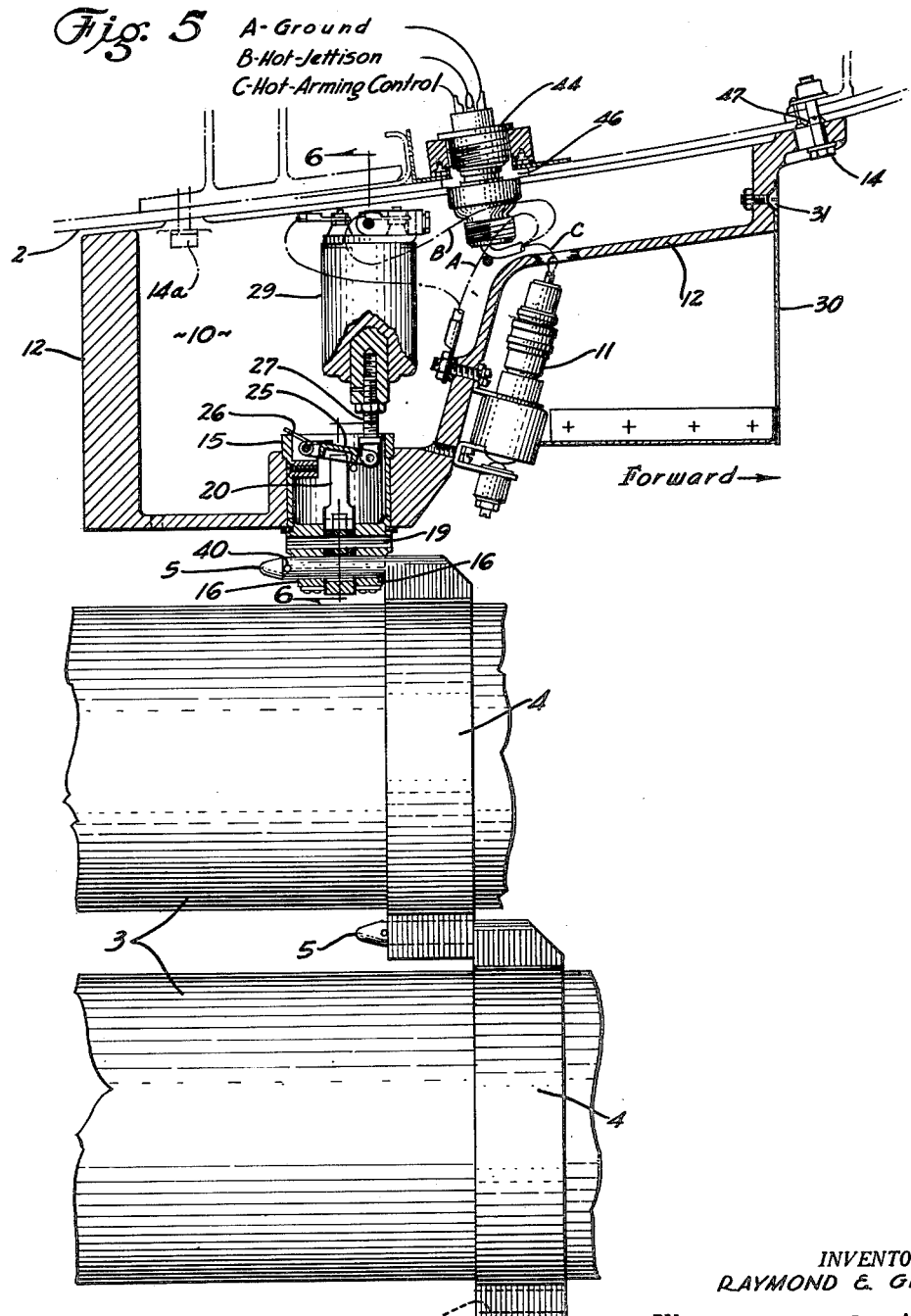

April 19, 1955  R. E. GRILL  2,706,431
ROCKET JETTISON MECHANISM
Filed May 16, 1949  4 Sheets-Sheet 4

INVENTOR
RAYMOND E. GRILL

BY Herbert E. Metcalf
ATTORNEY

United States Patent Office 2,706,431
Patented Apr. 19, 1955

2,706,431

ROCKET JETTISON MECHANISM

Raymond E. Grill, Long Beach, Calif., assignor to Northrop Aircraft, Inc., Hawthorne, Calif., a corporation of California Application May 16, 1949, Serial No. 93,438

3 Claims. (Cl. 89—1.7)

This invention relates to aircraft rocket launchers, and more particularly, to a mechanism for jettisoning such rockets in an emergency.

Many airplanes, especially those of a military type, are required to carry objects which are designed to leave the airplane while in flight. In the case of aircraft rockets used as projectiles, the rocket supports, which are usually installed on the lower side of the wing, carry provisions for allowing the rockets to slide forward out of their supports when they are fired. However, these supports do not release their vertical hold of the rockets, and thus the rockets can be separated from the airplane only by firing them.

As the adaptation of larger rockets to aircraft use has increased, their weight has become more important in relation to the gross weight of the airplane carrying them, and their inclusion forms a substantial portion of the useful load. Hence, in cases of emergency, it may be desirable to relieve the airplane of such rockets in order to permit continued flight, in much the same manner as is provided for other items such as bombs, external fuel tanks, and the like. However, it is not desirable to be required to fire these rockets in jettisoning them, or to drop them with the fuze of the explosive in an "armed" condition. The jettison mechanism should therefore allow the rockets to drop substantially vertically from the airplane.

It is an object of the present invention to provide an aircraft rocket launching support having a light weight jettison assembly adapted to release wing rockets in a "safe" condition.

Some airplane wing rocket supports are constructed so as to retract flush with the wing surface when not in use, thereby presenting no parasitic drag. However, these installations must necessarily be heavier and bulkier than a non-retracting support, and must be carried at all times regardless of whether or not rockets are to be carried on any given flight.

It is another object of this invention to provide a simple aircraft rocket launching and jettisoning support which is fixed rigidly to the airplane during rocket-carrying flights, and which is readily removable to leave a flush wing surface when not in use.

Briefly, the present invention comprises two pivoted members forming an enclosed space in which to insert and hang a rocket-mounted support pin. The support pin can slide horizontally out of this space when the rocket is fired, and the pivoted members are provided with means to rotate them open to drop the support pin from the bottom of the assembly. The pivoted members are preferably mounted in a streamlined casing which is adapted to be bolted to and make operating connections with mating parts inside of an airplane structure.

Reference is made to the accompanying drawings, shown by way of illustration and not limitation, wherein:

Figure 1 is a perspective view showing an airplane carrying eight wing rockets attached to jettison mechanisms embodying the present invention.

Figure 2 is a side elevation view of two of the rockets shown in Figure 1, taken from a cross section of the airplane wing adjacent these rockets.

Figure 3 is a perspective view showing the rockets' installation arrangement at the rear fins thereof.

Figure 4 is a partial side elevation view showing details of one rocket fin support bracket shown in Figure 3.

Figure 5 is a longitudinal section view of the jettison mechanism forming the forward support of the aircraft rocket, showing construction and attachment details.

Figure 6:
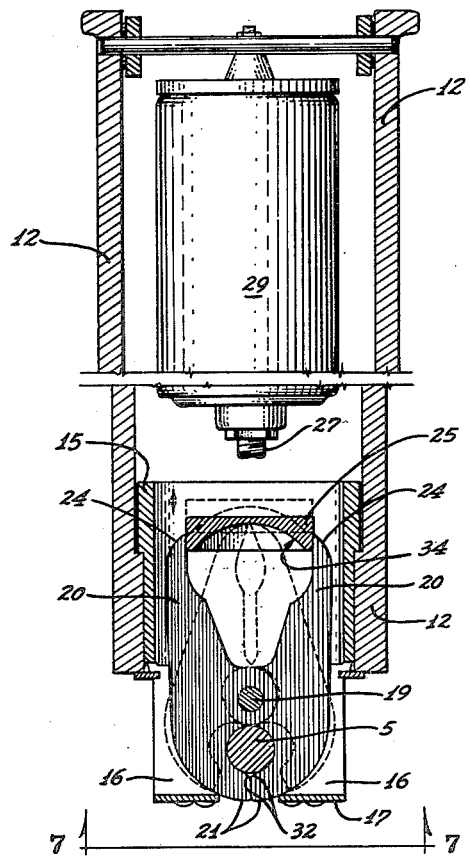
Figure 6 is a cross sectional view of the jettison mechanism, showing closed and open positions, and taken as indicated by broken line 6—6 in Figure 5.

Referring first to Figure 1 for a detailed description of my invention, an airplane 1 having two wing panels 2 is provided with four aircraft rockets 3 installed under each wing panel 2. As shown in Figures 2 and 3, each rocket is supported at one forward point and two rear points, the upper two of each group of four rockets being hung directly from the airplane, and the lower two being hung from the upper two. Each rocket 3 carries an encircling mounting band 4 near its forward end, and the mounting band 4 is equipped with a rearwardly pointing rocket support pin 5 on the upper side and a pin hanger 6 on the lower side.

At the rear of each rocket 3, four fins 7 are attached at 45° angles with the horizontal. The upper rocket of each pair is supported at the rear on two longitudinal fin recesses 8 provided at the rear corner of each fin 7. The lower rocket of each pair is supported at the rear by two notches 9 cut into the forward edges of the upper rocket fins and two similar notches cut into the rear edges of the lower rocket fins, thus positioning the lower rocket slightly forward of the upper rocket.

The rocket support pin 5 of the lower rocket slips into the pin hanger 6 of the upper rocket for forward support.

The support pin 5 of the upper rocket is installed in a jettison assembly 10 mounted on the wing panel 2.

Figure 7:
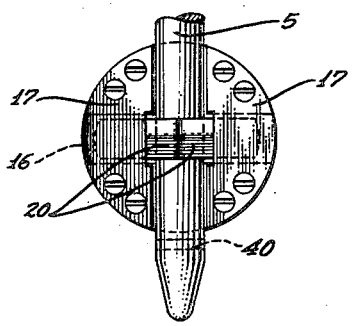
Figure 7 is a partial bottom view of the jettison mechanism, taken as indicated by the line 7—7 in Figure 6.

This jettison assembly 10, shown in Figures 5 and 6, serves as the normal carrier from which the rockets are fired, and includes arming control solenoids 11 for the rocket fuzes. The jettison assembly 10 comprises a structural casting 12 attached to the wing panel 2 by one forward bolt 14 and two aft bolts 14a. A support post 15 extends downwardly from the casting 12, this post being hollowed in its top portion and cut with two perpendicular grooves from its lower end to form four corner legs 16, the transverse groove extending farther up than the fore-and-aft groove. On the bottom end of the support post 15, two protective guide plates 17 are preferably installed, as further shown in Figure 7. These thin plates 17 define the proper groove for insertion of the rocket support pin 5, and tie the assembly together across the bottom of the relatively deep transverse groove in the support post 15.

Extending fore-and-aft through an intermediate point on the support post 15 is a pivot pin 19 crossing the transverse groove. Two release arms 20 are pivotally mounted about this pivot pin 19, their lower ends 21 butting together to form an enclosed space below the pivot pin 19. When closed in this manner, as shown by the solid outlines in Figure 6, the top ends 24 of the release arms 20 are separated from each other and on the same side of the pivot pin 19 as their respective lower ends 21, so that a sear block 25, fitting down between the arms, will keep the lower ends 21 closed.

The sear block 25 is pivotally mounted at the rear side of the hollowed out support post 15, and a sear spring 26 urges the sear block 25 downwardly at all times. When the sear block 25 is raised at its forward end, the top ends 24 of the release arms 20 are permitted to rotate inwardly, thus opening the lower ends 21. The forward end of the sear block 25 is rotatably connected to an armature plunger 27 of an electric jettison solenoid 29 positioned above the support post 15 within the casting 12. When energized, the jettison solenoid 29 will pull the plunger 27 and the sear block 25 upwardly to the released position, as shown by the dotted outlines of the sear block and release arms in Figure 6. A smooth sheet-metal fairing 30 is attached to the casting 12 by screws 31, and surrounds the arming solenoids 11 and forward end of the jettison assembly 10.

As is now evident, the rocket 3 is installed on the jettison assembly 10 by sliding the rocket support pin 5 between the legs 16 of the support post 15 and through the opening formed by the closed lower ends 21 of the release arms 20. When fired in the normal manner, the rocket 3 will travel forward, with the support pin 5 sliding out of the release arms 20 and thus leaving the airplane. If the jettison solenoid 29 is actuated at any time before firing, the rocket 3 will merely drop from its installed position without being fired. It will be noted that the lower ends 21 of the release arms 20 are formed with a chamfer 32 on their inside corners. This insures that the weight of the rocket will cause the support pin 5 to force open the release arms 20 from their fully closed position immediately upon actuation of the sear block 25.

After the rocket has been released by the jettison assembly 10, the release arms 20 will remain open at the bottom and closed at the top, due to the shape of the sear block 25. A concave cylindrical surface 34 is provided on the lower side of the sear block 25, its center of curvature lying approximately midway between the sear block 25 and the pivot pin 19.

Thus, when the jettison solenoid 29 is deenergized after jettison of the rocket, the sear block 25 will rest with the concave surface 34 on top of the release arm top ends 24, keeping the lower ends 21 open. All that is necessary to do to reset the mechanism prior to loading is to squeeze the lower ends 21 closed, utilizing the space provided by the transverse grooves in the lower sides of the support post 15. This action will slide the top ends 24 outwardly across the concave surface 34, raising the sear block 25 until the top ends separate sufficiently to straddle the sear block 25, at which time it will snap to its down position under the action of the sear spring 26 and thus lock the lower ends 21 closed.

In order to clarify the action of the jettison assembly 10 described above, in effecting the release of the rockets 3, the rear support points of the rockets are shown in Figures 3 and 4. The two fin recesses 8 at the top of each upper rocket mate with contact rods 35 carried by brackets 36 bolted to the lower side of the wing panel 2.

The contact rods 35 project forwardly parallel to the rocket support pins 5, so that installation of a rocket is accomplished by lifting it to the correct height with the support pin 5 just forward of the release arm lower ends 21 and the fin recesses 8 just forward of the contact rods 35, then moving the rocket to the rear to engage these mating parts in final position. Each lower rocket is hung onto the upper rocket in a similar manner by engaging its support pin 5 with the pin hanger 6, and simultaneously engaging the fin notches 9 described before.

The contact rods 35 are electrically connected to a firing cable 37 for each rocket, and make contact with a spring-loaded firing button 39 carried in the fin recess 8. Appropriate electrical connections to the lower rockets are supplied through the fin structure of the upper rockets.

Each lower rocket is fired first, before its corresponding upper rocket. A retaining hole 40 is provided at the rear of each rocket support pin 5 for the purpose of holding a safety wire or a suitable pin to prevent the rockets from sliding forward out of their supports before being fired. The safety device will shear off when the rocket thrust builds up, thus letting it go.

Each contact rod 35 is attached to its bracket 36 by means of an axle 41 positioned horizontally crosswise through the rear of the rod, and a similarly installed rivet 42 near the front. The rivet 42 is designed to shear off when the forward end of the rocket 3 falls. When the jettison mechanism is operated, the weight of the rocket shears the rivet 42 and allows the rocket to fall nose down, rotating about the axle 41 until the contact rod 35 reaches a position similar to that shown by phantom lines in Figure 4, where the socket then slides from the forward end of the contact rod 35. The lower rocket of course drops simultaneously with the upper rocket.

Electrical connections A, B, and C for the jettison solenoid 29 and arming solenoid 11 pass through the wing panel 2 at a plug connector 44 (Figure 5). When the jettison assembly 10 is removed for flights not carrying rockets, a filler plate (not shown) is installed in a skin cut-out 46 over the plug connector 44 to keep out dirt and present a smooth outside surface. The holes from which attachment bolts are removed, when the jettison assembly 10 is not installed, are provided with countersunk recesses 47 for the installation of flush head screws, both at the forward end (Figure 5) and aft end (Figure 4).

Thus it is seen that the present invention fulfills the requirements of a conventional rocket support, and additionally provides for jettison release of the rockets without being fired. The use of the two release arms as described results in a symmetrical mechanism producing substantially equal and opposite side loads on the sear block when in the locked position. Therefore, a minimum of binding occurs at the pivots of all moving parts, and the solenoid force required is relatively small, thus reducing the size of the solenoid necessary. These features all aid in reducing the size and overall weight of the installation.

In order to put the fuze of the rocket explosive charge in an "armed" condition, it is necessary to energize the arming control solenoid 11 before firing. Therefore, it is apparent that the actuation of the jettison solenoid 29 causes a substantially perpendicular release of the rocket with the arming solenoid 11 in a deenergized condition, so that the rocket is jettisoned in a "safe" condition.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claims.

What is claimed is:

1. A support and jettison mechanism for holding and releasing an object, which comprises a housing, an axle member fixed in said housing, two support members pivoted about said axle and having lower ends adapted to close together, said lower ends shaped to thus define a space bounded at the bottom and sides by said lower ends to form a vertical support for a part of said object to be suspended from, said support members having upper ends spaced apart when said lower ends are closed, said upper ends closing together when said lower ends are opened, means for locking said members with said lower ends closed which comprises a pivot pin member fixed in said housing at a projected right angle to said axle member, a sear element pivotally mounted on said pivot pin member and adapted to be disposed between said upper ends to block said upper ends apart, and unlocking means for rotating said sear element out of contact with said upper ends to permit opening of said lower ends to drop said object.

2. Apparatus in accordance with claim 1 wherein said unlocking means comprises power means having an actuating member pivotally connected to said sear element to move said sear element completely free of said upper ends when said power means is energized, and including elastic return means connected to said sear element to move said sear element oppositely to that recited above when said power means is deenergized, and wherein each of said lower ends is provided with a chamfer on its inner corner at the bottom of said space, said chamfer forming an inclined surface whereby the release of said object is facilitated when said upper ends are unlocked.

3. A support and jettison mechanism for holding and releasing an object, which comprises two pivoted members having lower ends adapted to close together and shaped to thus define a space bounded at the bottom and sides by said lower ends to form a vertical support for a part of said object to be suspended from, means for locking said members with said lower ends closed, means for unlocking said members to permit opening of said lower ends to drop said object, said members being pivoted about a common horizontal axis, said members having upper ends spaced apart when said lower ends are closed, said upper ends closing together when said lower ends are opened, said locking means comprising a sear element rotatably mounted on a horizontal pivot substantially perpendicular to and above said axis, said jettison mechanism having a locked position where said sear is disposed between said upper ends to physically block said upper ends apart, and an unlocked position where said sear is rotated upwardly out of contact with said upper ends, and elastic means connected to tend to rotate said sear downwardly, the lower surface of said sear forming a concave cylindrical surface having a center line of curvature lying between said sear and said axis and in the same plane as said axis, said surface being positioned to rest on said upper ends, under the force of said elastic means, when said upper ends are closed, whereby said jettison mechanism can be reset to said locked position, after said object has been dropped, by simultaneously pushing said lower ends closed, thus raising said sear element against said elastic means by the lever action of said upper ends against said cylindrical surface, until said upper ends have been separated far enough to allow said sear element to snap downwardly between said upper ends.

References Cited in the file of this patent

FOREIGN PATENTS

| | | |
|---|---|---|
| 236,671 | Great Britain | July 14, 1925 |
| 454,152 | Great Britain | Sept. 21, 1936 |
| 572,809 | Great Britain | Oct. 24, 1945 |
| 581,889 | Great Britain | Oct. 29, 1946 |